United States Patent
Zhou

(10) Patent No.: US 7,969,450 B2
(45) Date of Patent: Jun. 28, 2011

(54) METHOD FOR OPTIMIZING DISPLAY COLORS OF A DIGITAL LIGHT PROCESSING PROJECTOR

(75) Inventor: Jian-Sheng Zhou, Foshan (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 646 days.

(21) Appl. No.: 12/039,004

(22) Filed: Feb. 28, 2008

(65) Prior Publication Data

US 2009/0141037 A1 Jun. 4, 2009

(30) Foreign Application Priority Data

Dec. 3, 2007 (CN) .......................... 2007 1 0202829

(51) Int. Cl.
  *G09G 5/02* (2006.01)
  *G09G 5/00* (2006.01)
(52) U.S. Cl. .......................... 345/589; 345/591; 345/617
(58) Field of Classification Search .................. 345/207, 345/589
See application file for complete search history.

(56) References Cited

U.S. PATENT DOCUMENTS

| 7,034,852 B2 * | 4/2006 | Matsuda et al. ............. 345/690 |
| 7,639,401 B2 * | 12/2009 | Bala et al. ..................... 358/3.24 |
| 2007/0035701 A1 | 2/2007 | Lee |

* cited by examiner

*Primary Examiner* — Kee M Tung
*Assistant Examiner* — Sing-Wai Wu
(74) *Attorney, Agent, or Firm* — Andrew C. Cheng

(57) ABSTRACT

A system for optimizing display colors of a digital light processing projector includes a color analyzer, and a central processing module. The color analyzer is configured for detecting a first image produced by the projector to obtain actual brightness proportions of red, green, and blue light components associated with the first image, and obtaining a color coordinate of the first image at the actual brightness proportions. The central processing module is configured for adjusting the actual brightness proportions to pre-set brightness proportions to form a second image. The color analyzer detects the second image to obtain a color coordinate thereof. The central processing module adjusts the color coordinate of the second image to a pre-set standard color coordinate, and changes the first gamma curve of the projector to a second gamma curve according to the adjusted color coordinate of the second image.

2 Claims, 3 Drawing Sheets

_US 7,969,450 B2_

METHOD FOR OPTIMIZING DISPLAY COLORS OF A DIGITAL LIGHT PROCESSING PROJECTOR

BACKGROUND

1. Field of the Invention

The present invention relates to projector technology, and particularly, to a system and method for optimizing display colors of a digital light processing projector.

2. Description of Related Art

During mass production of digital light processing (DLP) projectors, color setting of the DLP projector is determined by a gamma curve built in the DLP projector. To avoid complicated adjustment of color settings of each DLP projector, gamma curves of a set of DLP projectors in the mass production are set according to a standard DLP projector, e.g., an engineering standard sample.

However, optical coatings of optical elements, such as optical coatings of projecting lenses, may have different tolerances.

What is needed, therefore, is to provide a system and method for optimizing display colors of a DLP projector, in which the above problem is eliminated or at least alleviated.

SUMMARY

The present invention relates to a system for optimizing display colors of a digital light processing projector. The system includes a color analyzer, and a central processing module. The color analyzer is configured for detecting a first image produced by the projector to obtain actual brightness proportions of red, green, and blue light components associated with the first image, and obtaining a color coordinate of the first image at the actual brightness proportions. The central processing module is configured for adjusting the actual brightness proportions to pre-set brightness proportions to form a second image. The color analyzer detects the second image to obtain a color coordinate thereof. The central processing module adjusts the color coordinate of the second image to a pre-set standard color coordinate, and changes the first gamma curve of the projector to a second gamma curve according to the adjusted color coordinate of the second image.

Other advantages and novel features of the present invention will become more apparent from the following detailed description of present embodiments when taken in conjunction with the accompanying drawings, in which:

DETAILED DESCRIPTION OF THE EMBODIMENTS

Reference will now be made to the figures to describe the at least one present embodiment in detail.

Figure 1:
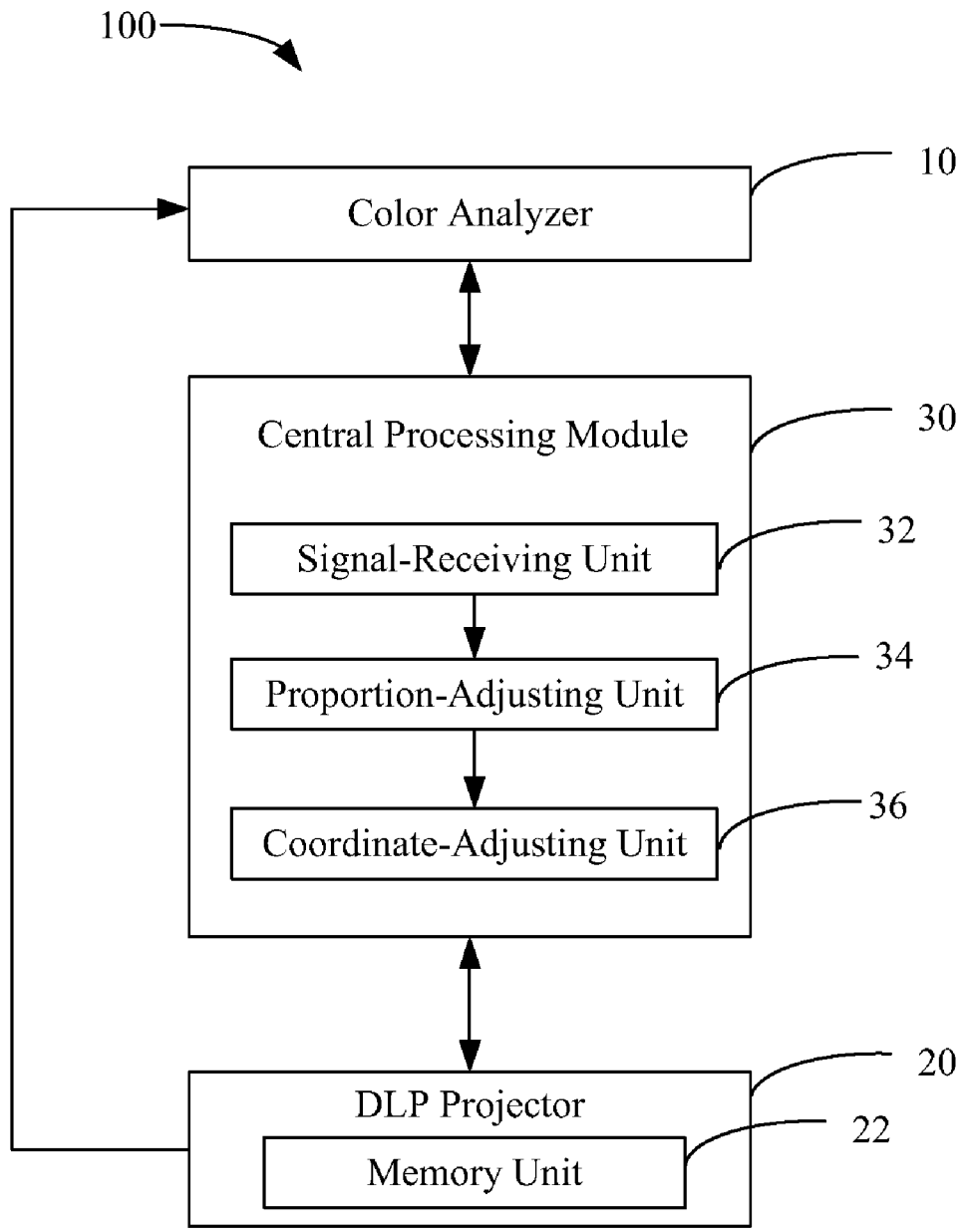
FIG. 1 is functional diagram of modules of a system for optimizing display colors of a DLP projector in accordance with a first present embodiment.

Referring to FIG. 1, a system 100 for optimizing display colors of a DLP projector 20, according to a present embodiment, is shown. The system 100 includes a color analyzer 10, and a central processing module 30.

The color analyzer 10 is configured for detecting an image to obtain actual brightness proportions of red, green, and blue light components associated with the image, and obtaining a color coordinate of such image.

The DLP projector 20 is one of many DLP projectors from a production run. The DLP projector 20 includes a memory unit 22 for storing signals processed by the DLP projector 20, and has a first gamma curve stored therein. The DLP projector 20 produces a first image on a screen (not shown) according to the first gamma curve, and inputs the first image to the color analyzer 10.

The central processing module 30 includes a signal-receiving unit 32, a proportion-adjusting unit 34, and a coordinate-adjusting unit 36. The signal-receiving unit 32 is configured for receiving the first image from the DLP projector 20, and receiving the actual brightness proportions of the first image from the color analyzer 10. The proportion-adjusting unit 34 is configured for adjusting the actual brightness proportions of the first image according to a pre-set brightness proportion group stored in a standard DLP projector to form a second image. The central processing module 30 inputs the second image to the color analyzer 10. The signal-receiving unit 32 is configured for receiving a color coordinate of the second image from the color analyzer 10. The coordinate-adjusting unit 36 is configured for adjusting the color coordinate of the second image according to pre-set standard color coordinate, and changing the first gamma curve to form a second gamma curve according to the adjusted color coordinate of the second image. The central processing module 30 stores the second gamma curve in the memory unit 22.

Figure 2:
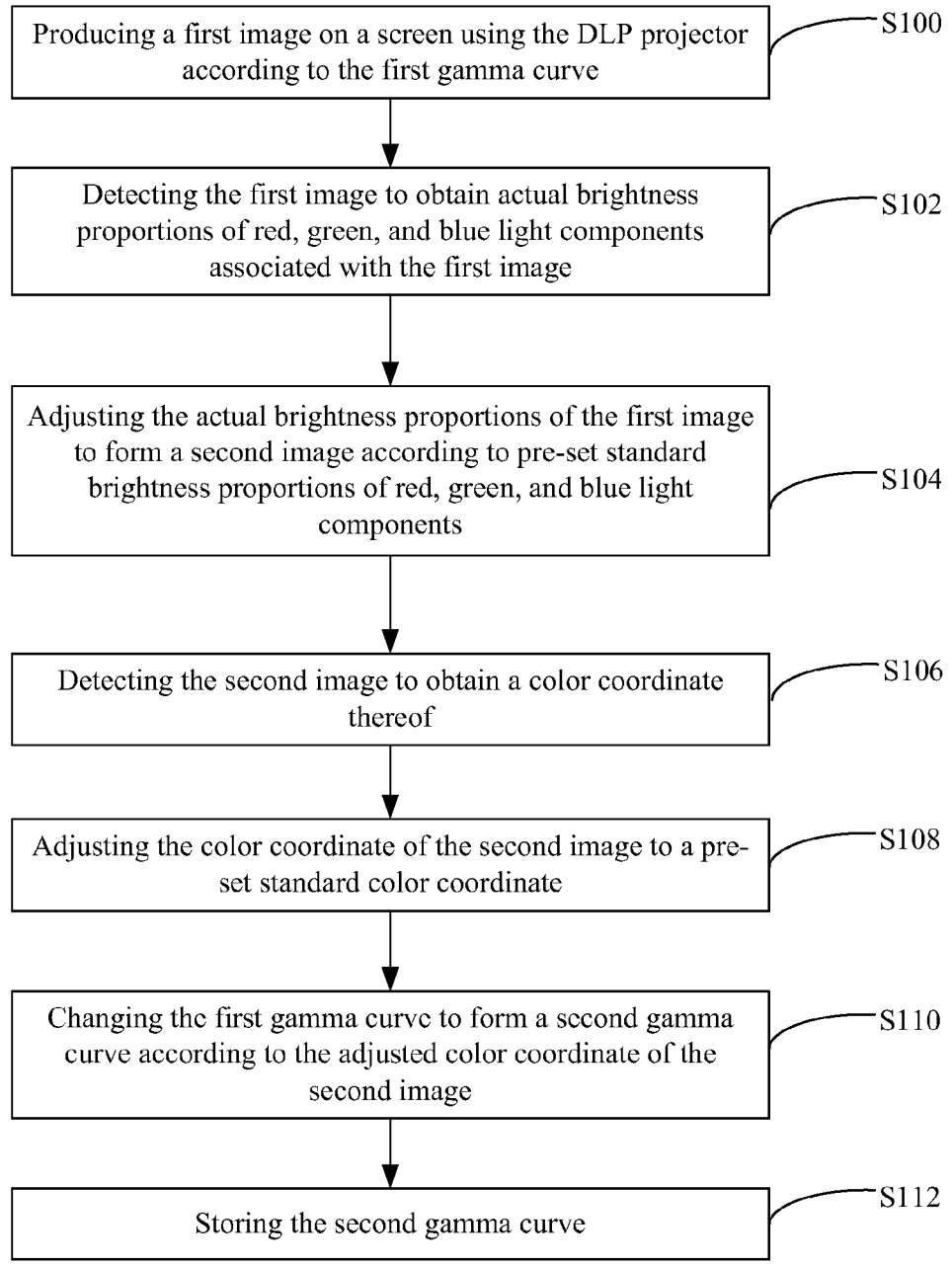
FIG. 2 is a flow chart of a method for optimizing display colors of a DLP projector in accordance with a second present embodiment.

Referring to FIG. 2, a color optimizing method for the DLP projector 20, according to a second embodiment, is shown. The method includes:

Step S100: producing a first image on a screen using the DLP projector 20 according to the first gamma curve;

Step S102: detecting the first image to obtain actual brightness proportions of red, green, and blue light components associated with the first image;

Step S104: adjusting the actual brightness proportions of the first image to form a second image according to pre-set standard brightness proportions of red, green, and blue light components;

Step S106: detecting the second image to obtain a color coordinate thereof;

Step S108: adjusting the color coordinate of the second image to a pre-set standard color coordinate;

Step S110: changing the first gamma curve to form a second gamma curve according to the adjusted color coordinate of the second image; and Step S112: storing the second gamma curve.

Figure 3:
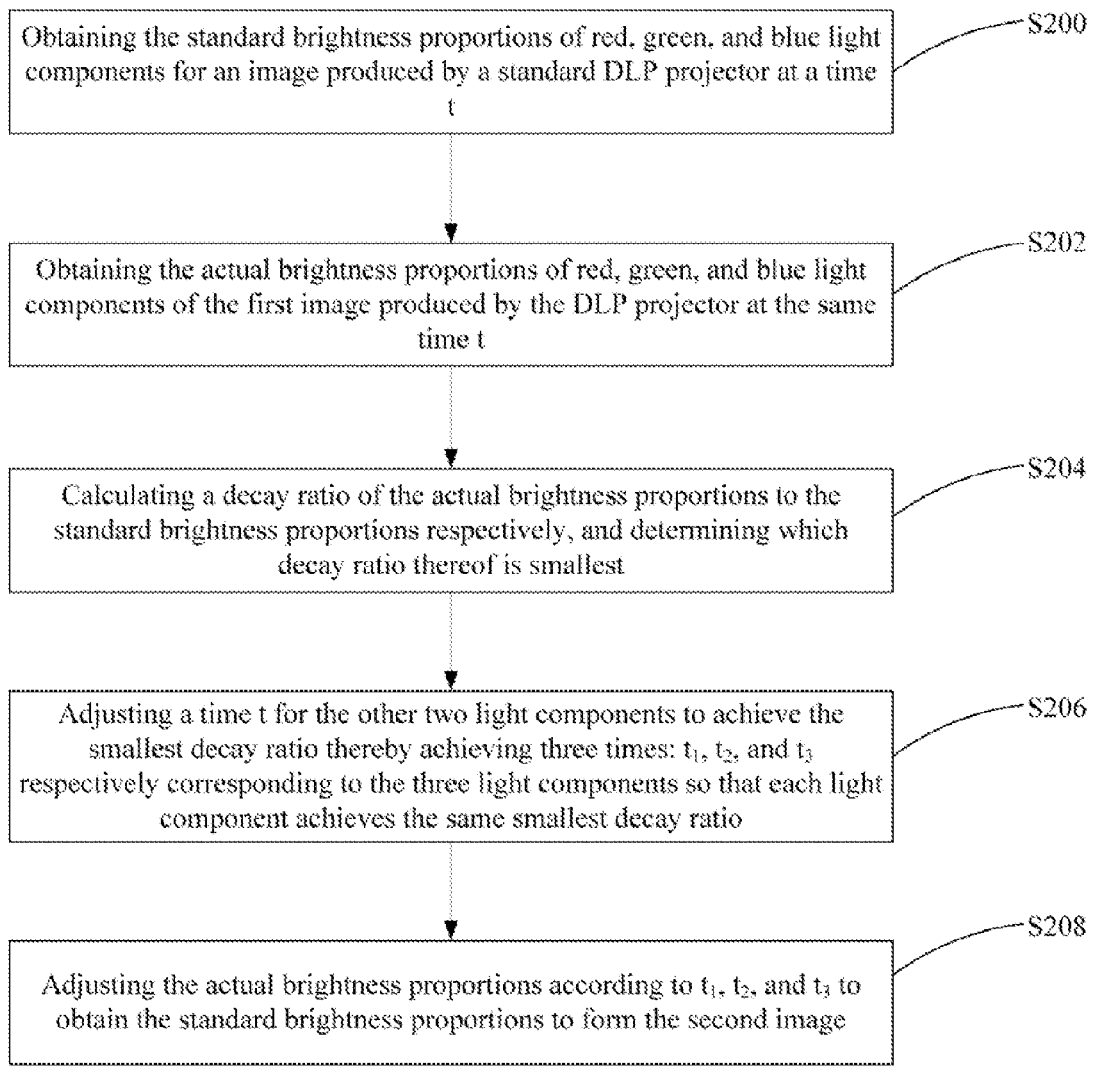
FIG. 3 is a sub-flow chart of the method of FIG. 2.

Referring to FIG. 3, step S104 includes:

Sub-step S200: obtaining the standard brightness proportions of red, green, and blue light components for an image produced by a standard DLP projector at a time t (a point in time after the DLP has been operating for a while and all functions are in a steady state);

Sub-step S202: obtaining the actual brightness proportions of red, green, and blue light components of the first image produced by the DLP projector 20 at the same time t;

Sub-step S204: calculating a decay ratio of the actual brightness proportions to the standard brightness proportions respectively, and determining which decay ratio thereof is smallest;

Sub-step S206: adjusting g time t for the other two light components to achieve the smallest decay ratio thereby achieving three times: $t_1$, $t_2$, and $t_3$ respectively corresponding to the three light components so that each light component achieves the same smallest decay ratio; and Sub-step S208: adjusting the actual brightness proportions according to $t_1$, $t_2$, and $t_3$ to obtain the standard brightness proportions to form the second image.

In step S108, for the color coordinate (x, y) of the second image, if x is larger than the x component of the standard color coordinate, brightness of the blue light component is decreased while brightness of the green light component is increased; if x is smaller than the x component of the standard color coordinate, brightness of the red light component is increased; if y is larger than the y component of the standard color coordinate, brightness of the red light component is increased while brightness of the blue light component is decreased; if y is smaller than the y component of the standard color coordinate, brightness of the green light component is increased; if x and y are both larger than the x, y components of the standard color coordinate, brightnesses of the red and green light components are decreased; if x is larger, while y is smaller than the x, y components of the standard color coordinate, brightness of the red light component is decreased, while brightness of the green light component is increased; if x and y are smaller than the x, y components of the standard color coordinate, brightnesses of the red and green light components are increased; and if x is smaller, while y is larger than the x, y components of the standard color coordinate, brightness of the red light component is increased, while brightness of the green light component is decreased.

Since a color coordinate of an image produced by the DLP projector 20 in the mass production is fixed according to a color coordinate of the standard DLP projector, and the gamma curve of the projector 20 in the mass production is fixed according to the fixed color coordinate.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for optimizing display colors of a digital light processing projector, the projector having a first gamma curve built therein, the method comprising:

producing a first image on a screen using the digital light processing projector according to the first gamma curve;

detecting the first image to obtain actual brightness proportions of red, green, and blue light components associated with the first image at a time t;

obtaining the standard brightness proportions of red, green, and blue light components for an image produced by a standard digital light processing projector at the same time t;

calculating a decay ratio of the actual brightness proportions to the standard brightness proportions respectively, and determining which decay ratio thereof is smallest;

adjusting time t for the other two light components to achieve the smallest decay ratio thereby achieving three times: $t_1$, $t_2$, and $t_3$ respectively corresponding to the three light components so that each light component achieves the same smallest decay ratio;

adjusting the actual brightness proportions according to $t_1$, $t_2$, and $t_3$ to obtain the standard brightness proportions to form a second image;

detecting the second image to obtain a color coordinate thereof;

adjusting the color coordinate of the second image to a pre-set standard color coordinate;

changing the first gamma curve to form a second gamma curve according to the adjusted color coordinate of the second image; and storing the second gamma curve.

2. The method as claimed in claim 1, wherein the step of adjusting the color coordinate of the second image to a pre-set standard color coordinate is performed by adjusting the actual brightness proportions of red, green, and blue light components associated with the first image.

* * * * *